(No Model.) 3 Sheets—Sheet 1.
D. C. STOVER & F. W. HOEFER.
MACHINE FOR MAKING LACE FASTENERS.
No. 592,455. Patented Oct. 26, 1897.
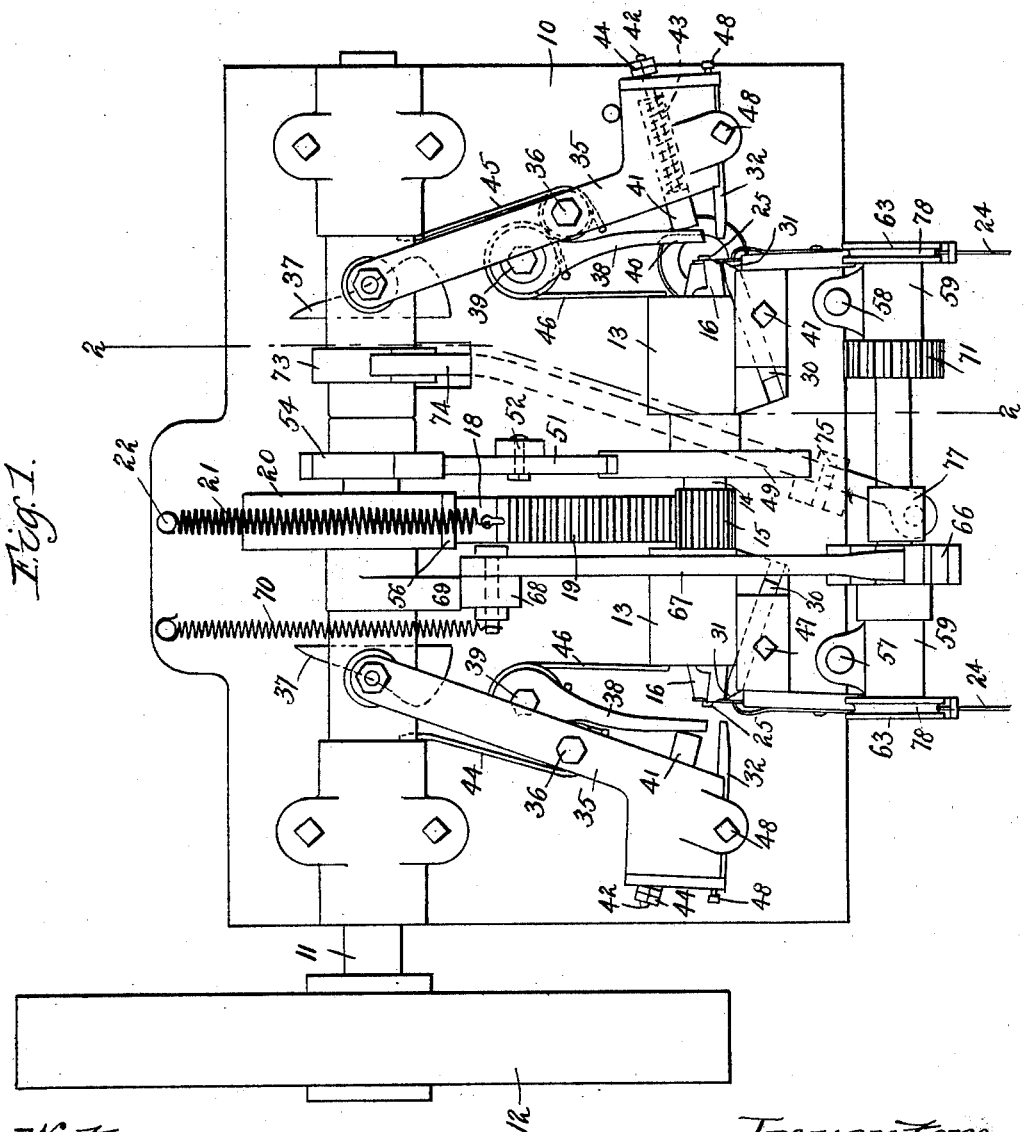
Witnesses.
Inventors
Daniel C. Stover
and Frederick W. Hoefer
by Morson & Darby
att'ys.

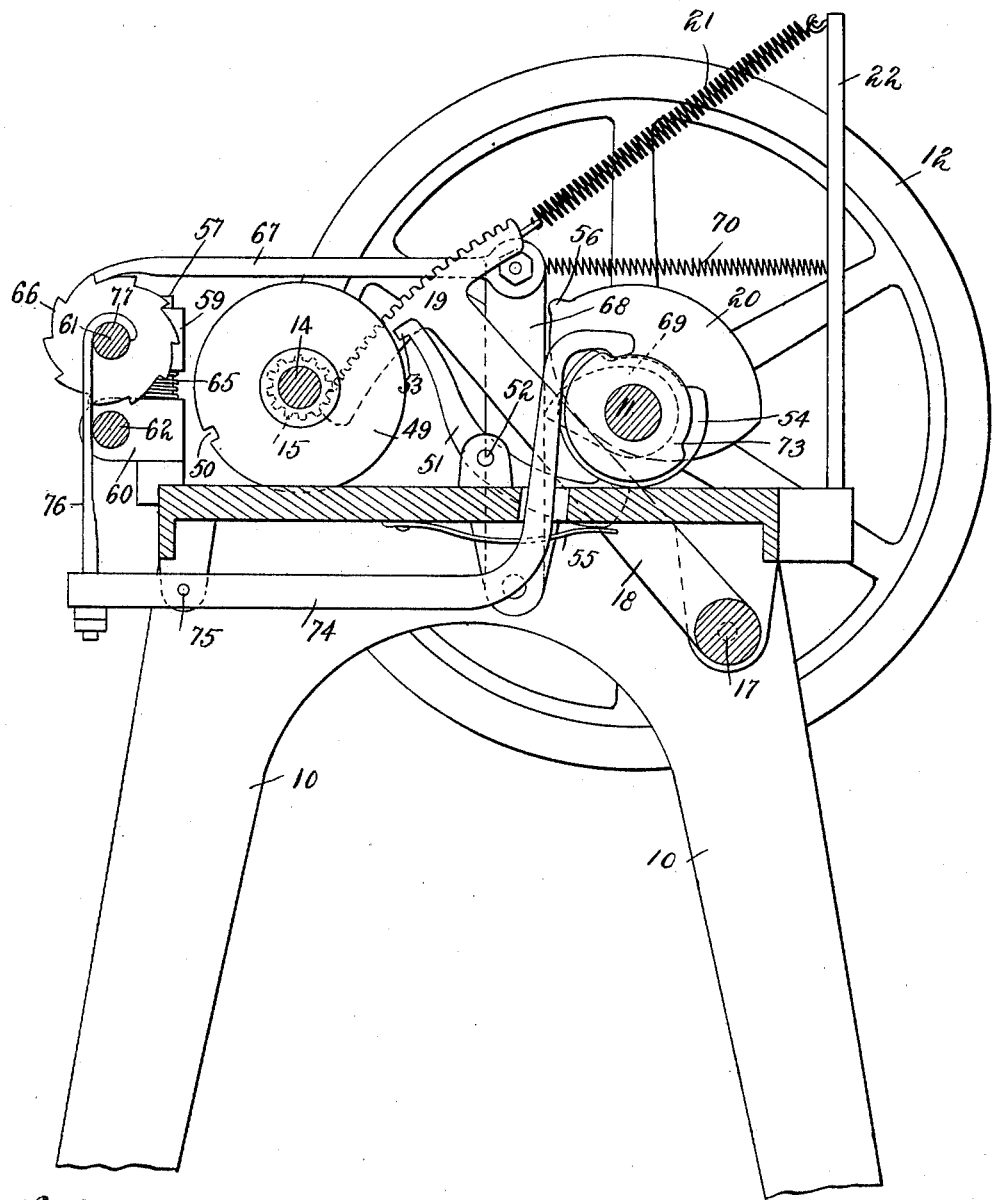

(No Model.) 3 Sheets—Sheet 3.
D. C. STOVER & F. W. HOEFER.
MACHINE FOR MAKING LACE FASTENERS.
No. 592,455. Patented Oct. 26, 1897.
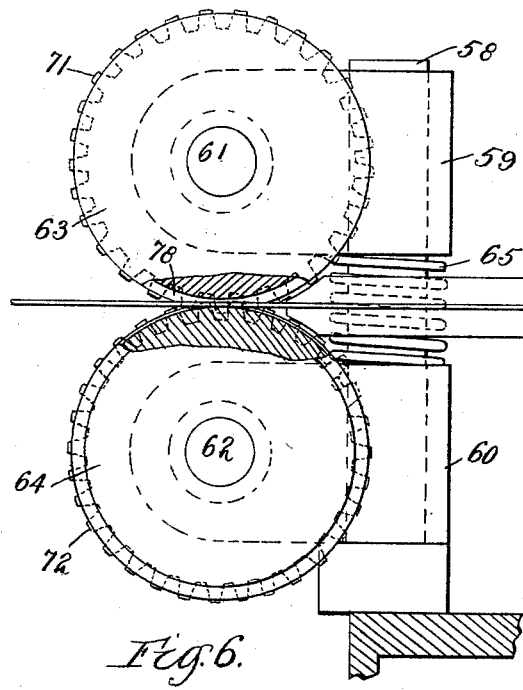
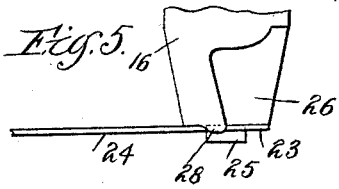
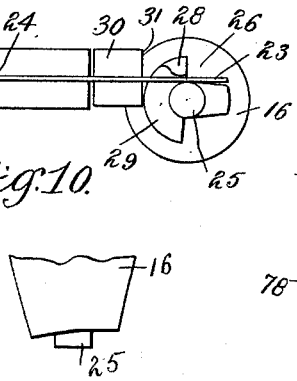
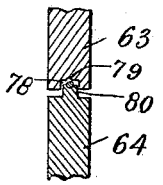
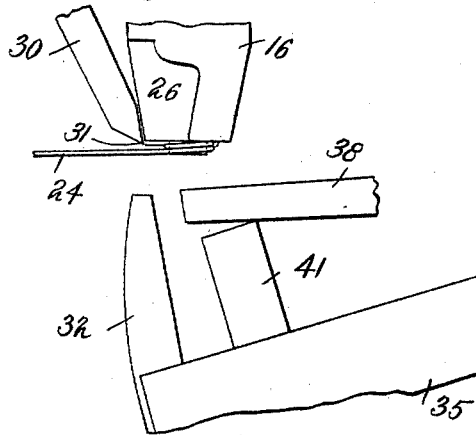
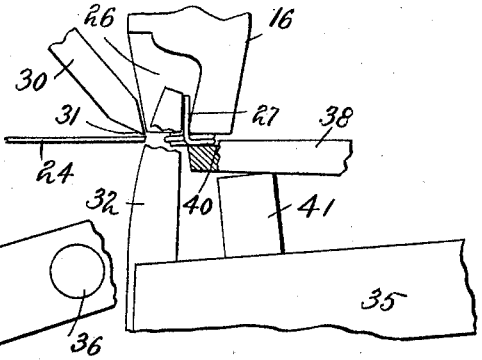
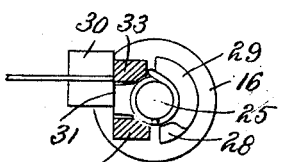
Witnesses.
Wm. M. Rheem
Wm. F. Henning
Inventors
Daniel C. Stover
and Frederick W. Hoefer
by Brown & Darby
Att'ys.

UNITED STATES PATENT OFFICE.

DANIEL C. STOVER AND FREDERICK W. HOEFER, OF FREEPORT, ILLINOIS, ASSIGNORS TO THE PRATT FASTENER COMPANY, OF CHICAGO, ILLINOIS.

MACHINE FOR MAKING LACE-FASTENERS.

SPECIFICATION forming part of Letters Patent No. 592,455, dated October 26, 1897.

Application filed June 1, 1896. Serial No. 593,951. (No model.)

*To all whom it may concern:*

Be it known that we, DANIEL C. STOVER and FREDERICK W. HOEFER, citizens of the United States, residing at Freeport, in the county of Stephenson and State of Illinois, have invented a new and useful Machine for Making Lace-Fasteners, of which the following is a specification.

This invention relates to machines for making lace-fasteners.

The object of the invention is to provide a machine of simple and novel construction, easily understood and operated, for manufacturing lace-fasteners.

The invention consists, substantially, in the construction, combination, location, and relative arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a plan view of a machine embodying our invention. Fig. 2 is a vertical transverse sectional view of the same on the line 2 2, Fig. 1. Fig. 3 is a detail view in side elevation, parts being in vertical transverse section, showing the feed-rolls and the manner of mounting the same and their relation to the winding-mandrel. Fig. 4 is a broken detached detail view, in transverse section, of the feed-rolls. Fig. 5 is a detached detail view in plan of the chuck end of the winding-mandrel. Fig. 6 is a fragmentary detail view in plan of the parts employed for forming the fastener, severing the same from the strand of wire, and bending the ends of the fastener at substantially right angles to the plane of the coils forming the fastener, said parts being shown in the position thereof after the wire has been coiled to form the fastener and before the fastener has been severed from the wire. Fig. 7 is a view similar to Fig. 6, the parts being shown in position after the fastener has been severed from the wire and its ends bent. Fig. 8 is a detached detail, in end view, of the winding-mandrel and severing-knife, as shown in plan in Fig. 6. Fig. 9 is a similar view of the same parts as shown in plan in Fig. 7, the bending-die for bending the ends of the fastener at right angles to the plane of its coils being shown in transverse section. Fig. 10 is a fragmentary view in plan of the coiling-chuck.

The same part is designated by the same reference-sign wherever it occurs throughout the several views.

Reference-sign 10 designates a framework of any suitable or convenient size and construction adapted to support the several parts of our invention and upon which are arranged suitable bearings for the main or power shaft 11, having a drive-pulley 12, adapted to receive rotary motion from any suitable or convenient source of power. From shaft 11 the various parts of the mechanism are actuated, as will more fully hereinafter appear.

In suitable bearings 13 of the framework 10 of the machine we journal a short shaft 14, which we shall hereinafter term the "winding-mandrel," and upon said winding-mandrel 14 we mount a small gear 15.

In the particular embodiment of our invention as illustrated in the drawings we have shown what we shall term a "duplex machine"—that is, a machine adapted to form two fasteners simultaneously—but we desire it to be understood that we do not limit or restrict ourselves thereto, as the principles of our invention may be embodied in a machine adapted to make only one or three or four fasteners simultaneously, as will be readily understood by persons skilled in the art.

In the duplex arrangement shown we mount on each end of the winding-mandrel what we shall designate a "coiling-chuck" 16, adapted, as will presently more fully appear, to receive the end of the wire or other material out of which the fastener is made and when rotated to coil the same therearound to form the fastener.

The winding-mandrel 14 is periodically rotated by the following instrumentalities: Suitably pivoted, as at 17, in the framework of the machine is an arm 18, carrying at its free end the segmental rack 19, having gear-teeth arranged to engage the pinion 15 on the winding-mandrel 14. Upon the main drive-shaft 11 we mount a cam 20, of suitable and desirable shape, adapted during the revolution of said main shaft to periodically engage said arm 18 and rock the same about its pivot 17, thereby effecting a rotation of the winding-mandrel 14 through the engagement of rack-gear 19 and pinion 15. The rocking of arm 18 about its pivot 17 under the influence of cam 20 is yieldingly opposed in any suitable manner, as by means of a stout spring 21, connected at one end to the segment 19 and at the other end to any convenient part of the framework—as, for instance, a standard 22—as clearly shown. The tendency of spring 21 is to constantly maintain the arm 18 in normal position in engagement with the cam 20 and the winding-mandrel in the required position to receive the end of the wire or other material from which the fastener is made.

We will now describe the peculiar construction and formation of the chuck 16, whereby said chuck is adapted to receive the end of the wire and to coil the same into one or more convolutions to form the fastener, it being understood that the fastener comprises, preferably, one complete convolution and a half of a convolution superimposed thereon and having the ends bent at right angles to the plane of the convolutions and passing outside of the coils. From this it will be seen that it is desirable that the front end 23 of the wire 24 from which the fastener is made be fed a sufficient distance beyond the coiling-chuck 16 to form the end of the fastener. It is also necessary to provide the chuck with means for grasping the wire to effect a coiling thereof when the chuck is rotated and to so shape the chuck that the convolutions of the wire forming the fastener lie alongside each other.

We have shown an illustrative embodiment of a form of chuck whereby these objects may be readily attained, wherein the chuck is provided with a cylindrical portion 25 at the extreme end thereof of an external diameter corresponding to the internal diameter of the coils or convolutions of the fastener and upon which said coils or convolutions are formed. A portion of the body of the chuck 16 is cut away, as at 26, to provide a space into which the ends 23 and 27 of the fastener may be bent, as will presently more fully appear.

In order that the chuck may grasp the wire 24 to effect a coiling of the same, we provide the chuck upon the end thereof with a projecting flange or lip 28 in position for the end 23 of the wire to be fed between said flange and the cylindrical portion 25 when the parts occupy their normal position at the beginning of the operation of making a fastener, as clearly shown in Figs. 3 and 5. When the end 23 of the wire has been fed into position to extend through the space between the projecting lip or flange 28 and the cylindrical portion 25 of the chuck and said chuck is rotated, the wire is grasped or engaged by the lips or projections 28 and is thereby held during the formation of the coils or convolutions of the fastener.

In order to properly guide the coils or convolutions during the process of their formation to the end that the said coils or convolutions will lie side by side in the form of a helix instead of being coiled upon each other spirally—as, for instance, like a watch-spring—we slightly incline the portion or wall 29 of the end of the chuck relative to the axis of rotation of said chuck, so that as the chuck revolves the coil is formed into a helix toward the extreme outer end of the chuck, as clearly shown in the drawings.

We will now describe an arrangement of devices for severing the formed fastener from the strip 24 of wire after it is formed and for bending the ends thereof at substantially right angles to the plane of the convolutions.

Reference-sign 30 designates a tool stationarily held adjacent to the chuck 26 and on that side of the chuck from which the wire 24 is fed and having a knife-edge 31, presented transversely and adjacent to the path of feed of the wire to the chuck, and at a distance from the chuck such as to leave a sufficient length of wire to form the end 27 of the fastener.

Arranged to coöperate with the tool or ledger blade 31 is a combined severing and bending die 32, comprising the arms 33 34, (see Fig. 9,) carried by a lever 35, pivotally mounted, as at 36, upon a convenient part of the framework and arranged to be engaged and rocked by a cam 37 upon the main drive-shaft 11. The arm 33 of the severing and bending die coöperates with the edge of the tool or ledger blade 31 to effect a severing of the coiled fastener from the wire from which the fastener is made, and thereafter upon a further rocking of lever 35 the arms 33 and 34 engage the ends 23 and 27 of the severed fastener and bend the same at substantially right angles to the plane of the coils or convolutions over the walls of the chuck 16, forming the cut-away portion 26, as clearly shown.

In Figs. 6 and 8 the parts are shown in plan and end elevation, respectively, in position ready for the severing and bending die to be advanced to its work, and in Figs. 7 and 9 are shown in plan and end elevation, respectively, the parts in the positions assumed after the severing and bending die has been fully advanced and has completed its work.

In order that the coiled fastener may be held upon the cylindrical portion 25 of the coiling-chuck and prevented from being twisted out of shape during the operation of the severing and bending die, we provide a lever 38, and pivotally mount the same, as at 39, upon a suitable and convenient part of the framework of the machine to be engaged by the lever 35 when said lever is advanced to its work and whereby said lever 38 may be rocked into position to bear flatwise upon the end of the cylindrical portion 25 of the coiling or winding chuck. In practice we prefer to provide that end of lever 38 which engages the end of the portion 25 of the winding-chuck with a recess or groove, as indicated in dotted lines at 40, Fig. 1, and in full lines by the partial section in Fig. 7. By this construction the fastener-coils are received in said recess and are not only prevented from being unduly warped or detached from the cylindrical portion 25 of the winding-chuck, but are firmly held in place during the severing and bending operations. It is desirable that the lever 38 be advanced yieldingly or resiliently to its work in order to compensate for any inequalities in the size of the wire. We therefore mount in lever 35 a projecting plunger 41, arranged to engage and rock said lever 38, said plunger being carried by a rod or bolt 42, and a spring 43 (indicated in dotted lines in Fig. 1) serves to constantly force the plunger outwardly from lever 35 and in the direction of lever 38. The tension of said spring may be adjusted by the nuts 44.

The rocking movements of levers 35 and 38 about their pivots are opposed by suitable springs 45 46, which tend to maintain said lever 35 in constant engagement with its controlling-cam 37 and also to return said levers after they have completed their work.

Suitable means are provided for permitting adjustment of the tools 30 and the bending-dies 32—as, for instance, the bolts 47 48.

It is important that the winding or coiling chucks 16 be held rigidly against rotation during the operation of severing the fastener and bending the ends thereof. In order to accomplish this result, we mount a disk 49 upon the winding-mandrel 14 and provide said disk with a peripheral notch, as indicated at 50, Fig. 2. A lever 51, pivotally mounted upon a convenient part of the framework, as at 52, has its end 53 arranged adjacent to the path of travel of the periphery of the disk 49. A cam 54, mounted upon the main drive-shaft, is arranged to engage said lever 51 and periodically rock the same about its pivot and against the action of a spring 55, which tends to maintain the engagement of said lever and cam. The cam 54 is so timed as to its action that the end 53 of lever 51 is projected by said cam into the peripheral notch 50 at the required point to lock the winding-mandrel against further rotation. This point in the operation of the mechanism is attained when the fastener has been wound or coiled and the severing and bending die is ready to be advanced to its work. The cam 54 at the proper time releases the disk 49 and permits the mandrel 14 to be again actuated or rotated in the manner above set forth.

From the foregoing description it will be seen that the end of the wire from which the fastener is made is grasped by the lip 28 of the chuck 16 and is wound or coiled upon the cylindrical portion 25 of the chuck during the rotation thereof, the wire being drawn or fed to the winding-chuck by the rotation of the latter.

It will also be understood from the foregoing description that in the form of fastener made by the machine—namely, one having one complete convolution and a half of a convolution—it is necessary in the formation of such fasteners to impart to the mandrel 14 one and a half revolutions. This operation, however, causes the fastener to be tightly wound upon the cylindrical portion 25 of the coiling-chuck. It is therefore desirable to make provision for the easy and expeditious removal of the complete fastener from the mandrel in order that the machine may be thoroughly efficient and practical. We will now describe a simple and efficient construction and arrangement whereby this result is attained.

The cam 20, by which lever 18 is rocked to effect through segment-gear 19 and pinion 15 a rotation of the winding-mandrel 14, is provided with a sharply-defined projection or portion 56, which is so relatively arranged and timed as to effect a rocking of said lever 18 beyond the point necessary to impart one and a half revolutions to the mandrel 14—that is, a point which will result in said mandrel 14 being rotated to, say, about one complete revolution and three-fourths of another revolution. The passage of the projection or portion 56 of the cam 20 beyond the point of effectiveness with respect to lever 18 causes said lever to rebound or react under the influence of spring 21 and within the limits of the remaining portions of cam 20 to a point where mandrel 14 will have been revolved just one complete revolution and one-half of another revolution from its starting-point. The effect of this arrangement is to cause the cylindrical portion 25 to revolve in a reverse direction one-quarter of a revolution within the coils or convolutions of the fastener, said coils remaining stationary, thereby loosening the coils or convolutions upon said cylindrical portion and enabling the completed fastener to be readily detached and ejected from the machine.

From the foregoing description it will be seen that when the formed fastener has been severed from the wire 31, as shown in Fig. 7, the end of said wire is some distance from the chuck 16. Therefore it is necessary to provide some means for advancing the end of the wire to the chuck when the previously-formed fastener has been completed in order to form the next succeeding fastener. We will now describe an arrangement whereby this result may be effected.

On suitable standards 57 58, conveniently mounted upon the rear of the machine-frame 11, we loosely sleeve blocks 59 60, in which are formed journal-bearings adapted to receive the shafts 61 and 62, each carrying, in the duplex form of machine shown, a pair of rollers 63 64. A strong spring 65 is interposed between the blocks 59 60, normally tending to separate said blocks. Upon one of said shafts—say, for instance, shaft 61—is mounted a ratchet-disk 66. A pawl or arm 67, connected to a lever 68, which is pivotally mounted upon a convenient part of the framework, is arranged to engage the teeth of the ratchet-disk 66. A cam 69, mounted on the main drive-shaft 11, is arranged to engage and periodically rock said lever 68 and thereby effect a projection of pawl or arm 67 in a direction to engage and rotate disk 66, and with it shaft 61. A spring 70 serves to maintain lever 68 in constant engagement with cam 69. Mounted upon the shafts 61 62 are the intermeshing gears 71 72, whereby the rotation of the shaft 61, as above pointed out, is imparted to shaft 62, but in a reverse direction.

Simultaneously or in coöperative relation with the actuation of shafts 61 62, as above explained, a cam 73 upon the main drive-shaft 11 engages one end of a lever 74, pivotally mounted, as at 75, upon the framework of the machine. To the other end of said lever 74 is connected an arm or rod 76, which is arranged to engage, as by means of a hook 77, with shaft 61, whereby said shaft is drawn laterally toward shaft 62 and against the action of springs 65, which springs tend normally to separate said shafts. In the operation of the machine this rotation and relative lateral movement of shafts 61 62 takes place upon the completion of the severing and bending operations and after the severing and bending die is returned to its normal or retracted position.

The periphery of the roll 63 of each pair of rolls 63 64 is provided with a circumferential recess 78, (see Fig. 4,) in which is formed a seat semicircular in cross-section, as indicated at 79, Fig. 4. In the periphery of the other member 64 of said pairs of rolls is formed a peripheral projection or flange 80, adapted to be received in the recess 78, and said projection or flange 80 is provided with a seat semicircular in cross-section similar to the seat 79 and corresponding and coöperating therewith. The wire 31, from which the fastener is made, is introduced to the machine through the pairs of rolls 63 64 and is received in the semicircular seats formed in the peripheries of said rolls, as clearly shown in Fig. 4.

From the foregoing description it will be seen that when the shafts 61 62 are moved laterally toward each other by the rocking of levers 74 the rolls 63 64 effect a clamping between them of the wire 31. The coincident rotation of said rolls thereupon effects a feeding forward of the end of the wire into the position shown in Fig. 3, the mandrel-operating mechanism having at this time completed its work upon the preceding fastener and returned said mandrel to the required position to receive the end of the wire in the space between lip 28 and the cylindrical portion 25. The advancing end of the wire forces an entrance into the space between the end wall or surface of the chuck and the coil of the previously-formed fastener, and as said previously-formed fastener has been loosened upon its winding mandrel by the slight rotation thereof in a reverse direction said advancing end of the wire forces the previously-formed fastener off of the cylindrical portion 25 of the winding-mandrel and into any suitably-arranged receptacle placed to receive the same.

The operation of the machine will be thoroughly understood from the foregoing description.

Many variations, changes, and alterations in the specific construction, arrangement, and location of parts would readily suggest themselves to persons skilled in the art and still fall within the spirit and scope of our invention. We do not desire, therefore, to be limited or restricted to the exact details of construction, arrangement, and location of parts shown and described; but, Having now set forth the object and nature of our invention and a form of apparatus embodying the same, and having explained the construction, function, and mode of operation thereof, what we claim as new and useful and of our own invention, and desire to secure by Letters Patent, is—

1. In a machine for making lace-fasteners, a coiling-mandrel adapted to receive the material from which the fastener is made, means for rotating said mandrel, whereby said material is coiled thereon to form the body of the fastener, in combination with means for bending the ends of the formed fastener at substantially right angles with the plane of the coils thereof; as and for the purpose set forth.

2. In a machine for making lace-fasteners, a coiling-mandrel adapted to receive the material from which the fastener is made, means for rotating said mandrel, whereby said material is coiled thereon to form the body of the fastener, means for feeding the material to said mandrel, means for severing the completed fastener after it is formed on said coiling-mandrel and means for bending the ends of the fastener after it is formed at substantially right angles to the plane of the coils thereof; as and for the purpose set forth.

3. In a machine for making lace-fasteners, a coiling-mandrel adapted to receive the material from which the fastener is made, means for rotating said mandrel, whereby said material is coiled thereon to form the body of the fastener, means for severing the completed fastener after it is formed on said coiling-mandrel, and means for simultaneously bending both the ends thereof after the fastener is formed at substantially right angles with respect to the plane of the coils; as and for the purpose set forth.

4. In a machine for making lace-fasteners, a coiling-mandrel adapted to receive the material from which the fastener is made and to coil the same thereon, and means for rotating said mandrel slightly beyond a predetermined point and for permitting said mandrel to reversely rotate to said predetermined point whereby the coiled fastener is loosened from mandrel, as and for the purpose set forth.

5. In a machine for making lace-fasteners, a coiling-mandrel, means for rotating the same comprising an oscillating segment and means for positively locking said mandrel against rotation at a predetermined point, as and for the purpose set forth.

6. In a machine for making lace-fasteners, a coiling-mandrel provided with a chuck having a cylindrical portion upon which the coils forming the body of the fastener are formed and a projecting lip between which and said cylindrical coiling portion the end of the fastener material is adapted to be inserted, and means for rotating said mandrel; as and for the purpose set forth.

7. In a machine for making lace-fasteners, a coiling-mandrel provided with a chuck having a cylindrical portion upon which the fastener is spirally coiled into circular convolutions, said spiral coil having the same diameter and a projecting lip, the end of the material from which the fastener is made adapted to be received between such cylindrical portion and such lip, means for rotating said coiling-mandrel, and means for bending the ends of the cylindrical coils of the fastener into right-angular relation with respect to the planes of such coils, as and for the purpose set forth.

8. In a machine for making lace-fasteners, a coiling-mandrel provided with a chuck having a cylindrical portion upon which the strip of fastener material is coiled to form the fastener, said chuck also provided with an end wall, a portion of such end wall being arranged in a plane angular with respect to the axis of rotation of such mandrel, as and for the purpose set forth.

9. In a machine for making lace-fasteners, a coiling-mandrel provided with a chuck having a portion upon which the coils are formed and also having an end wall, one side of said end wall being cut away, said chuck also provided with a projecting lip, the material from which the fastener is made adapted to be inserted between said lip and the coiling portion of said chuck, in combination with means for severing the fastener from the material from which it is made and for bending the ends of the fastener into the space formed by such cut-away portion of the chuck, as and for the purpose set forth.

10. In a machine for making lace-fasteners, a coiling-mandrel adapted to receive the end of the strip from which the fastener is made, means for imparting to such mandrel one or more complete revolutions or parts of revolutions, and a plunger arranged to sever the coiled fastener from the strip of material and to bend the ends of such fastener angularly with respect to the plane of revolution of the coils thereof, as and for the purpose set forth.

11. In a machine for making lace-fasteners, a coiling-mandrel adapted to receive the end of the strip from which the fastener is made, means for rotating said mandrel one or more revolutions or partial revolutions whereby the fastener is coiled upon said mandrel, in combination with a ledger-blade arranged adjacent to said mandrel and in the path of said strip, and a coöperating plunger adapted to sever the completed fastener from such strip and to bend the ends thereof at substantially right angles to the plane of the convolutions or coils of such fastener, as and for the purpose set forth.

12. In a machine for making lace-fasteners, a coiling-mandrel adapted to receive the end of the strip from which the fastener is made, means for rotating said mandrel one complete revolution and an additional half-revolution, a forked plunger adapted to sever the coiled fastener from such strip and to bend the ends of such fastener at substantially right angles to the plane of the coils thereof, as and for the purpose set for.h.

13. In a machine for making lace-fasteners, a coiling-mandrel adapted to receive the end of the strip from which the fastener is made, means for rotating such mandrel to form said fastener, a plunger arranged to sever the completed fastener from such strip and to bend the ends thereof angularly with respect to the plane of the convolutions or coils of such fastener, and means for retaining such fastener upon said mandrel during the severing and bending processes, as and for the purpose set forth.

14. In a machine for making lace-fasteners, a mandrel adapted to receive the end of the strip from which the fastener is made, means for rotating said mandrel to effect a coiling of the fastener thereon, a plunger adapted to be advanced to sever the completed fastener from said strip and to bend the ends thereof at right angles with respect to the coils or convolutions of such fastener, and means for yieldingly holding the fastener on said mandrel during such severing and bending operations, as and for the purpose set forth.

15. In a machine for making lace-fasteners, a coiling-mandrel adapted to receive the end of the strip from which the fastener is made, means for rotating said mandrel, a pivotally-mounted arm having the free end thereof arranged to engage said coiling-mandrel to maintain said fastener thereon, in combination with a plunger adapted to be advanced to sever the fastener from the strip of material and to bend the ends thereof at an angle to the plane of the coils of the fastener, as and for the purpose set forth.

16. In a machine for making lace-fasteners, a coiling-mandrel adapted to receive the end of the strip from which the fastener is made, means for rotating said mandrel, a pivotally-mounted lever having a recess formed in the free end thereof adapted to be rocked to receive the coiling-mandrel in the recess in such end whereby the formed fastener is held upon said mandrel, in combination with a severing and bending die arranged to sever the fastener from the strip of material and bend the ends thereof angularly to the plane of the coils of such fastener, as and for the purpose set forth.

17. In a machine for making lace-fasteners, a coiling-mandrel adapted to receive the end of the strip of material from which the fastener is made, means for rotating said mandrel, a pivotally-mounted lever having the free end thereof arranged adjacent to the end of said coiling-mandrel and adapted when rocked to engage the end of said mandrel to hold the fastener thereon, in combination with a plunger carrying a severing and bending die adapted to sever the fastener from the strip of material from which it is made and bend the ends thereof angularly to the plane of the coils of such fastener, said lever arranged to be engaged and rocked by said plunger when said plunger is advanced to its work, as and for the purpose set forth.

18. In a machine for making lace-fasteners, a coiling-mandrel adapted to receive the end of the strip from which the fastener is made, means for rotating said mandrel to form the fastener, a severing and bending die adapted to sever the fastener from the strip of material from which the fastener is made and bend the ends thereof angularly to the plane of the coils thereof, means for advancing the same to its work, a spring-mounted plunger carried by said die-operating means, means for holding the fastener during the severing and bending operations, said fastener-holding means adapted to be engaged yieldingly and operated by said spring-mounted plunger, as and for the purpose set forth.

19. In a machine for making lace-fasteners, a coiling-mandrel adapted to receive the end of the strip from which the fastener is made, means for rotating said mandrel comprising a pivoted arm, a main drive-shaft, a cam thereon, arranged to engage and actuate said arm, means for yieldingly maintaining said arm in engagement with said cam and means for locking said mandrel at the required point, as and for the purpose set forth.

20. In a machine for making lace-fasteners, a coiling-mandrel adapted to receive the end of the strip from which the fastener is made, a gear-wheel mounted on said mandrel, a movable rack having gear-teeth arranged to engage the gear on said mandrel, a cam for moving said rack, a spring for maintaining said rack in engagement with said cam, and means for locking said mandrel against rotation at a desired point, as and for the purpose set forth.

21. In a machine for making lace-fasteners, a coiling-mandrel adapted to receive the end of the strip from which the fastener is made, a gear mounted on said mandrel, a rack having gear-teeth arranged to mesh with and drive said gear, a main drive-shaft, a cam thereon arranged to engage and actuate said rack to impart to said mandrel one complete revolution and an additional half-revolution, and a tooth formed on said cam arranged to further move said rack to impart to said mandrel a rotary movement beyond the additional half-revolution, means whereby said mandrel will reversely rotate an amount equal to such further rotation, and means for locking said mandrel at the completion of such reverse movement, as and for the purpose set forth.

22. In a machine for making lace-fasteners, a coiling-mandrel adapted to receive the end of the strip from which the fastener is made, a gear carried by said mandrel, a pivotally-mounted arm carrying gear-teeth arranged to engage said gear, a main drive-shaft, a cam thereon arranged to engage said arm and rock the same to impart to said mandrel one complete revolution and an additional half-revolution, and a tooth or projection carried by said cam adapted to rock said arm beyond the point required to impart to said mandrel said additional half-revolution, a spring against the action of which said arm is rocked, whereby said mandrel is reversely rotated an extent equal to the amount of such further rotation beyond said additional half-revolution, and means for locking said mandrel upon the completion of such reverse rotation, as and for the purpose set forth.

23. In a machine for making lace-fasteners, a coiling-mandrel adapted to receive the end of the strip from which the fastener is made, a gear mounted on said mandrel, a rack having gear-teeth adapted to engage the gear-wheel, a main drive-shaft, a cam thereon arranged to engage and move said rack to impart to said mandrel one or more complete revolutions and an additional half-revolution, a spring arranged to maintain said rack in engagement with said cam, a pivotally-mounted dog arranged to engage and lock said mandrel against rotation at the completion of the action of said rack, and a cam mounted on said main drive-shaft arranged to periodically engage and actuate said dog, as and for the purpose set forth.

24. In a machine for making lace-fasteners, a coiling-mandrel provided with a chuck, said chuck having a cylindrical coiling portion and a lip projecting in a line parallel with the axis of said cylindrical coiling portion, the end of the strip from which the fastener is made adapted to be received between said projecting lip and the cylindrical coiling portion of said chuck, means for imparting rotation to said mandrel whereby the body portion of said fastener is coiled on the cylindrical coiling portion of said chuck, means for severing the completed fastener and means for feeding the end of said strip into the space between said projecting lip and cylindrical coiling portion to be grasped thereby to form the next succeeding fastener, as and for the purpose set forth.

25. In a machine for making lace-fasteners, a coiling-mandrel provided with a chuck having a cylindrical coiling portion and a lip arranged to project parallel with said coiling portion, the end of the strip from which the fastener is made adapted to be received between said projecting lip and said coiling portion, means for imparting to said mandrel one or more complete revolutions and a partial revolution whereby the body portion of the fastener is coiled on said cylindrical coiling portion of the chuck, means for severing the completed fastener from said strip, a feeding mechanism for the strip, and means for actuating said feeding mechanism at the completion of said severing operation whereby the end of the strip is presented to the mandrel to form the next succeeding fastener, as and for the purpose set forth.

26. In a machine for making lace-fasteners, a coiling-mandrel adapted to receive the end of the strip from which the fastener is made, means for rotating said mandrel whereby the body portion of said fastener is coiled on said mandrel, means for reversely rotating said mandrel, whereby the coils are loosened upon said mandrel and means for severing the completed fastener from such strip, means for advancing the end of the strip to the mandrel to form the next succeeding fastener and to eject from the mandrel the previously-formed fastener, as and for the purpose set forth.

27. In a machine for making lace-fasteners, a coiling-mandrel provided with a chuck, said chuck having a cylindrical portion upon which the coils of the body of the fastener are formed and a projecting lip arranged adjacent to such coiling portion, means for presenting the end of the strip from which the fastener is made to such mandrel and between said lip and said cylindrical coiling portion comprising feeding-rolls, means for periodically clamping said strip between said rolls and gearing for positively rotating said rolls simultaneously with such clamping operation, as and for the purpose set forth.

28. In a machine for making lace-fasteners, a coiling-mandrel provided with a chuck having a cylindrical coiling portion and a projecting lip in proximity thereto, a feeding mechanism for the strip of material from which the fastener is made adapted to present the end of the strip in the space between said lip and cylindrical coiling portion, said feeding mechanism comprising a pair of peripherally-grooved feeding-rolls, one of said rolls being yieldingly mounted, means for periodically moving said yieldingly-mounted roll to effect a clamping of the strip in the peripheral grooves in said rolls and gearing for positively and simultaneously with such clamping rotating said rolls, as and for the purpose set forth.

In witness whereof we have hereunto set our hands this 25th day of May, 1896, in the presence of two subscribing witnesses.

DANIEL C. STOVER.
FREDERICK W. HOEFER.

Attest:
L. HUGHES,
A. J. STUKENBERG.